Sept. 5, 1972     E. T. ERIKSSON     3,689,239

FLASH-BACK ARRESTOR

Filed March 15, 1971

INVENTOR
ERIK T. ERIKSSON

BY Larson, Taylor and Hinds

ATTORNEYS 3,689,239
FLASH-BACK ARRESTOR
Erik Torvald Eriksson, Lidingo, Sweden, assignor to Aga Aktiebolag, Lidingo, Sweden
Filed Mar. 15, 1971, Ser. No. 124,264
Claims priority, application Sweden, Mar. 19, 1970, 3,682/70
Int. Cl. A62c 3/04; F17c 13/12
U.S. Cl. 48—192
5 Claims

ABSTRACT OF THE DISCLOSURE

A flash-back arrestor comprising a housing with an inlet and an outlet channel and including a flame arrestor, a pressure wave arrestor and a non-return valve. The pressure wave arrestor consists of a movable piston with a central passageway. The piston is arrestable in a closed position to close the inlet channel. The central passageway of the piston includes a valve seat for a non-return valve which closes for back flow. The piston is movably arranged in a cylinder member with a flange inwardly directed towards the piston periphery. A number of spring-loaded balls forming the arresting means rest on said flange, and the spring-load is transferred via one or more wedge-shaped bodies. Said bodies can move upwards and downwards in the cylinder member and they are arranged to press the balls against the periphery of the piston, said periphery being provided with a cone-shaped shoulder between its upper part and its lower part in order to keep the piston in position by means of the balls when the piston is in the opened position.

BACKGROUND OF THE INVENTION

Figure 1:
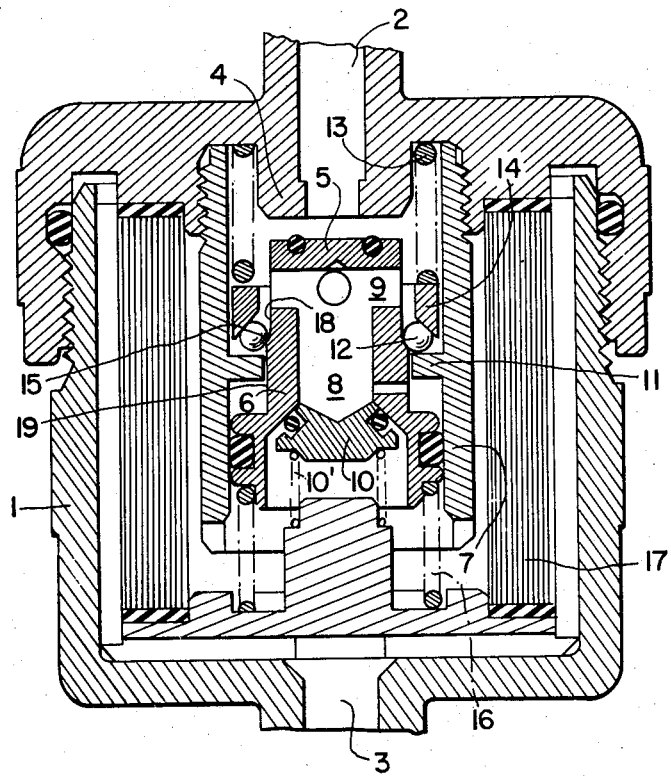

The present invention relates to a flash-back arrestor comprising a housing with an inlet and an outlet channel, the device including a flame arrestor, a pressure wave arrestor, and a non-return valve.

Flash-back arrestors of this kind are used in gas conduits to prevent a flash-back consisting of explosions to proceed in the conduit towards the gas source. In flash-back arrestors of this kind three essential functions can be distinguished: (1) prevention of flash-back; (2) stop flash-back; and (3) stop the gas flow after a flash-back.

In this kind of flash-back arrestor it is known to use the pressure wave created by the explosion to influence an impulse body which is moved to close the connection between the inlet and the outlet channel. A flash-back arrestor of this kind is, for instance, described in earlier Swedish Pat. No. 198,939. In this construction, the valve body has served two purposes, viz on the one hand to be a normal non-return valve and on the other hand to serve as a pressure wave arrestor through the action of an impulse body. The latter function has proved to be reliable in most cases, but not always.

It is an object of the present invention to provide a flash-back arrestor having an increased ability to stop flash-backs and having an increased safety against back-flow and post-flow.

BRIEF SUMMARY OF THE INVENTION

The foregoing and other objects which will be apparent to those having ordinary skill in the art are achieved according to the invention by providing a flash-back arrestor comprising a housing including an inlet channel and an outlet channel, flame arrestor means positioned in said housing adjacent said outlet channel, a cylinder member forming a cylinder adjacent said inlet channel, a piston moveable within said cylinder from an open position with the piston spaced from the inner end of said inlet channel to a closed position with the piston closing the inner end of said inlet channel, said piston including a channel having an inlet adjacent the inner end of said inlet channel and an outlet adjacent the inner end of said outlet channel to place the inlet and outlet channels in fluid communication when the piston is in said open position, a non-return valve in said housing adjacent the outlet end of said piston channel and including a valve member resiliently urged towards said piston channel outlet end to prevent flow in a direction from said outlet channel to said inlet channel, first spring means for holding said piston in said open position in said cylinder member, and second spring means for resiliently urging said piston for motion in said cylinder into said closed position, said first spring means being adapted to hold said piston in said open position in the absence of a pressure wave entering said housing through said outlet channel and being adapted to be released when a pressure wave enters said housing through said outlet channel, whereupon said piston is moved to said closed position by said second spring means.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of this invention.

Figure 2:
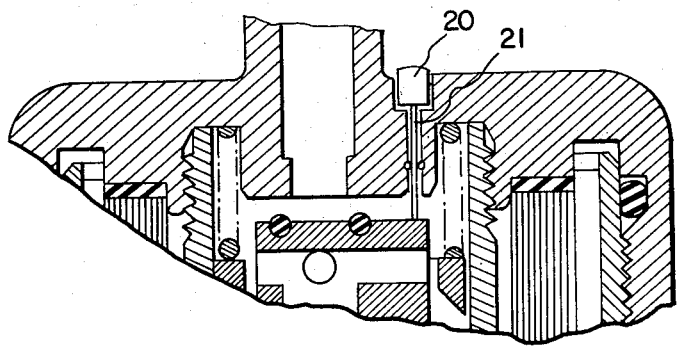

FIG. 1 is an axial section through a flash-back arrestor according to the invention; and FIG. 2 shows a detail of a modified flash-back arrestor according to the invention.

Details corresponding to each other in the two embodiments have been given the same reference numerals. The flash-back arrestor consists of a housing 1 comprising an inlet channel 2 and an outlet channel 3. The opening of the inlet channel 2 inside housing 1 is formed as a valve seat 4. Cooperating with this valve seat 4 is a valve means 5 arranged on a piston 6 which is movably arranged in a sleeve-shaped cylinder member 7. The piston 6 comprises a hollow body with an aperture channel 8 directed downwards from the inlet channel 2. The interior of piston 6 communicates with the inlet channel 2 in the opened position via a number of holes 9 in the upper part 18 of the peripheral surface of piston 6. Channel 8 may be closed by means of a spring loaded non-return valve 10, influenced by a spring 10' and by the flow of gas through the device from inlet channel 2 to outlet channel 3.

The sleeve-shaped member 7 has a flange 11 which is directed inwardly against the piston periphery in order to guide piston 6. Flange 11 furthermore serves as a support surface for an arresting means in order to lock piston 6 in the opened position shown in FIG. 1. The arresting means comprises a number of balls 12, for instance four, which are loaded against the piston periphery by a spring 13 via wedge-shaped bodies 14. The wedge-shaped bodies 14 are preferably joined together in a ring.

The balls 12 are pressed against the piston periphery, in the opened position of the piston against the periphery on the upper part 18 closest to the inlet channel 2 and in the closed position against the periphery on the lower part 19 of the piston. The upper part of piston 6 has a somewhat smaller diameter than the lower part and includes a cone-shaped shoulder ring 15, located intermediate the upper part 18 and the lower part 19. The piston is also influenced by a spring 16, the force of which is greater than the force from the gas flowing through inlet channel 2. However, in the open position, balls 12 hold the piston in the open position and thus spring 16 does not move the piston into the closed position.

The flash-back arrestor is also provided with a flame arrestor. In the preferred embodiment, the flame arrestor comprises a sintered compact 17. The flame arrestor should be situated near the outlet channel 3 and, in the preferred embodiment of the invention, it surrounds the sleeve-shaped cylinder member 7. The surrounded valve arrangement is thereby effectively protected against flame contact. A large permeability area is obtained by making the sintered compact 17 tubular and giving it a suitable wall thickness, which is of great advantage.

In FIG. 1, the flash-back arrestor is shown in an operating condition. Piston 6 is then held in position by balls 12 influenced by a spring force from spring 13, said spring keeping piston 6 arrested in the opened position. Normal gas flow is thus passing through inlet channel 2, past valve seat 4, in through the holes 9 and the channel 8, where the gas influences and opens non-return valve 10 in order to flow on through the sintered compact 17 and the outlet channel 3. When flash-back occurs, a flame as well as a pressure wave enter through outlet channel 3. The flame is stopped by the sintered compact 17 but the pressure wave passes this bar. The pressure wave will close valve 10 and will actuate the piston so that it will endeavor to close. The force from the spring 13 on the arresting means is insufficient to keep the piston in the opened position and the piston 6 will take its closed position under the influence of spring 16. Then the gas flow stops since the gas pressure inlet force is less than the force from the spring 16.

In order to make possible a new gas flow after flash-back one must dismantle the flash-back arrestor shown in FIG. 1 and press the piston 6 back in the opened position via inlet channel 2. In the embodiment shown in FIG. 2, the piston 6 may be brought back to the opened position by means of a knob 20, said knob actuating piston 6 via a rod 21.

What is claimed is:
1. A flash-back arrestor comprising:
   a housing including an inlet channel and an outlet channel;
   flame arrestor means positioned in said housing adjacent said outlet channel;
   a cylinder member forming a cylinder adjacent said inlet channel;
   a piston moveable within said cylinder from an open position with the piston spaced from the inner end of said inlet channel to a closed position with the piston closing the inner end of said inlet channel, said piston including a channel having an inlet adjacent the inner end of said inlet channel and an outlet adjacent the inner end of said outlet channel to place the inlet and outlet channels in fluid communication when the piston is in said open position;
   a non return valve in said housing adjacent the outlet end of said piston channel and including a valve member resiliently urged towards said piston channel outlet end to prevent flow in a direction from said outlet channel to said inlet channel;
   first spring means for holding said piston in said open position in said cylinder member; and
   second spring means for resiliently urging said piston for motion in said cylinder into said closed position, said first spring means being adapted to hold said piston in said open position in the absence of a pressure wave entering said housing through said outlet channel and being adapted to be released when a pressure wave enters said housing through said outlet channel, whereupon said piston is moved to said closed position by said second spring means.

2. A flash-back arrestor according to claim 1 wherein said cylinder member includes an inwardly directed cylindrical peripheral flange intermediate the ends of said cylinder member; wherein said piston is cylindrical and having a reduced outside diameter in its portion adjacent the housing inlet channel thereby forming a shoulder intermediate the ends of said piston, said shoulder being positioned adjacent the surface of said flange adjacent said housing inlet channel when said piston is in said open position;
   said first spring means including a plurality of balls located on said surface of said flange and at least one wedge shaped member spring-biased to urge said balls against said shoulder to hold said piston in said open position.

3. A flash-back arrestor according to claim 2 wherein said wedge shaped member is a ring surrounding said piston and adaped to engage all of said balls.

4. A flash-back arrestor according to claim 1 further including means for re-setting the piston to its open position from its closed position.

5. A flash-back arrestor according to claim 4 wherein said re-setting means comprises a rod member extending through and moveable within an aperture in said housing, said rod member being engageable with said piston in said closed position and adapted to move said piston into said open position whereupon said first spring means holds said piston in said open position.

References Cited
UNITED STATES PATENTS

| | | | |
|---|---|---|---|
| 3,252,905 | 8/1941 | Wendland | 48—192 |
| 2,913,320 | 11/1959 | Williams | 48—192 |
| 3,288,578 | 11/1966 | Witt | 48—192 |

MORRIS O. WOLK, Primary Examiner

D. G. MILLMAN, Assistant Examiner

U.S. Cl. X.R.
137—460